United States Patent [19]

Lyon

[11] Patent Number: 4,965,963
[45] Date of Patent: Oct. 30, 1990

[54] PLATFORM AND WATERING SYSTEM FOR PLANTS

[75] Inventor: William Lyon, Westbury, N.Y.

[73] Assignee: Plant-Tech Horticultural Products, Inc., Mineola, N.Y.

[21] Appl. No.: 172,076

[22] Filed: Mar. 23, 1988

[51] Int. Cl.$^5$ .............................................. A01G 25/00
[52] U.S. Cl. ............................................. 47/81; 47/79
[58] Field of Search ................... 47/39, 81, 84, 74, 79, 47/85, 86, 87; 206/45.14, 423, 220, 441, 620; 229/23 A, 23 R, DIG. 13; 217/31, 33; 248/152, 174, 459

[56] References Cited

U.S. PATENT DOCUMENTS

| | | | |
|---|---|---|---|
| 2,148,048 | 2/1939 | Gray | 47/84 |
| 2,300,776 | 11/1942 | Collins | 47/81 |
| 2,695,474 | 11/1954 | Barstow | 47/81 |
| 3,021,042 | 2/1962 | Stumpf, Jr. | 229/23 A |
| 3,521,741 | 7/1970 | Beaudry | 47/74 |
| 4,339,891 | 7/1982 | Bassett | 47/81 |
| 4,573,570 | 3/1986 | Cortopassi | 229/DIG. 13 |
| 4,586,649 | 5/1986 | Webinger | 229/903 |
| 4,697,699 | 10/1987 | Schneider | 229/23 R |

Primary Examiner—Robert A. Hafer
Assistant Examiner—Charles H. Sam
Attorney, Agent, or Firm—Darby & Darby

[57] ABSTRACT

A support and watering system for a plant pot in which a support module is formed by a strip of plastic material having panels which are folded relative to each other so that the end panels interlock and form a generally triangular support module. The lower set of panels edges rest on the bottom of a container for holding water. A capillary wick is inserted into the bottom of the plant pot which rests on the top edges of the module panels, with the wick extending into the container and the plant is watered by capillary action. A plurality of the modules can be interlocked to increase the size of the support.

11 Claims, 1 Drawing Sheet

U.S. Patent
Oct. 30, 1990
4,965,963
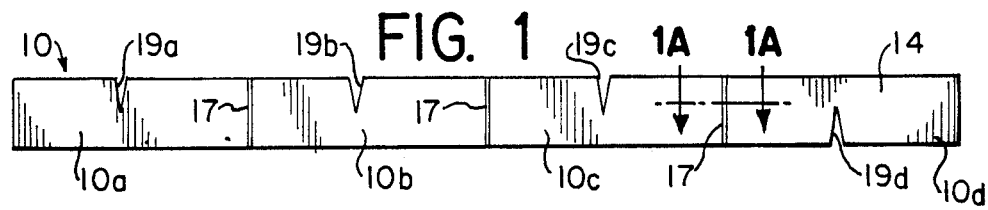
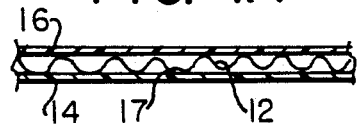
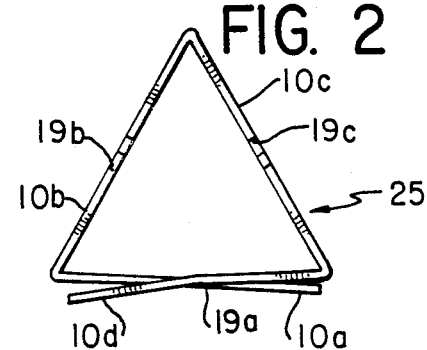
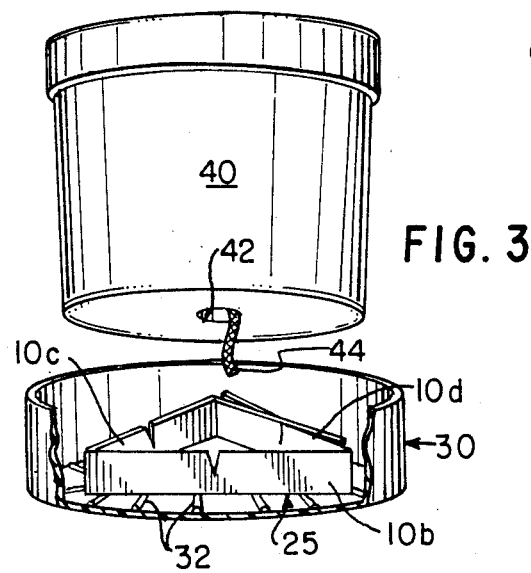
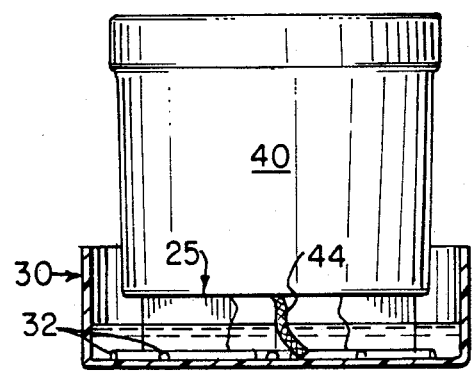
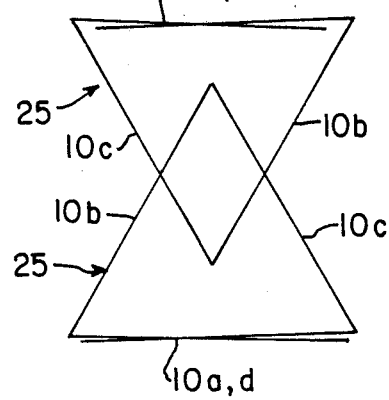

PLATFORM AND WATERING SYSTEM FOR PLANTS

BACKGROUND OF THE INVENTION

Applications exist to water potted plants directly or, for example, when such plants are located in a wicker or other decorative baskets or holders. Heretofore, such watering has been carried out either directly by pouring water into the pot or by the use of capillary mats or wicks. A capillary mat basically is a piece of fabric material which can absorb and transmit water to a plant by capillary action. The plant is generally placed on top of the mat and there is some arrangement for supplying water from a reservoir to the mat. As disclosed, for example, in U.S. Pat. No. 2,695,474, capillary wicks can be used to water plants. Such a wick is also of fabric material. It is inserted directly into the soil in the plant pot and has an end extending into the water reservoir.

In the various prior art plant watering systems, the plant pot is usually placed in the reservoir on some sort of a platform, for example, a saucer or other similar device, so that the bottom of the pot is raised above the water. If the bottom of the pot rests directly in the water, then too much water will be applied to the soil in the pot directly through the pot, which is usually of porous material, or through a hole in the bottom of the pot.

BRIEF DESCRIPTION OF THE INVENTION

The present invention relates to a novel plant watering system which includes a novel plant pot support member. In accordance with the invention, the support is formed by a strip of material which is substantially rigid in the vertical direction but which can be folded. The strip is divided into panels which are folded into a generally triangular shaped module and held together by a novel interlocking arrangement. A single module has the bottom set of edges of the interlocked strip panels placed on the bottom of the reservoir and the pot is placed on the upper set of edges of the panels. The modules themselves can be interlocked to form a larger support platform for the plant. The strips which form the modules are made of a non-porous material, such as plastic.

A capillary wick has one end inserted through the bottom of the pot to make contact with the soil and the other end of the wick extends into the containers which serves as the reservoir for the water. Water is poured into the container up to any level below the bottom of the pot and the wick waters the soil in the pot by capillary action.

OBJECTS OF THE INVENTION

It is therefore an object of the present invention to provide a novel plant pot support and watering system.

An additional object is to provide a novel plant support and watering system in which the support is formed by a strip of material divided into panels are folded and interlocked to form a support module with a number of such modules being interlocked themselves to form a larger support.

Another object is to provide a plant support and watering system in which the support is folded from a strip of material into a relatively rigid vertically extending member on which a pot can be rested, with the support raising the pot above the bottom of a container in which the support is located.

Yet a further object is to provide a watering system for a plant pot formed by a strip of material having foldable panels which are interlocked to form a support module with the edge of the module capable of supporting a vertical load, such as a plant pot, and a capillary wick which makes contact with the soil in the plant pot.

Other objects and advantages of the present invention will become more apparent upon reference to the following specification and annexed drawings in which:

FIG. 1 is a plan view of a strip of material which is used to form a support module;

FIG. 1a is an end view of the strip of FIG. 1

FIG. 2 shows the panels of the strip of FIG. 1 interlocked to form the support module;

FIG. 3 is a perspective view, shown partly broken away, of a plant pot which is to be placed on the support module;

FIG. 4 is a perspective view, shown partly broken away, showing the plant pot resting on the support module; and FIG. 5 is a top plan view showing a plurality of the support modules interlocked.

DETAILED DESCRIPTION OF THE INVENTION

FIGS. 1 and 1a show the details of the strip 10 which is used to form a support module. Strip 10 is of plastic corrugated material that is generally formed by three members, as shown in FIG. 1a. These elements are an elongated corrugated (serpentine) core member 12 which extends across the complete height (from top to bottom) of the strip as shown in FIG. 1 and along its entire length. Corrugated member 12 is sandwiched between two co-extensive sheets of plastic material 14 and 16, one on each side of the corrugated member 12. Each of the two sheets of plastic material 14, 16 is bonded to the corrugated member 12, one on each side at the points along the peak of each of the corregations where it comes into contact with the inner surface of a respective one of the sheets 14 and 16. The strips 12, 14 and 16 of material are co-extensive along the entire length of the composite strip 10.

A typical height for the module strip 10 would be about 2 inches and then are approximately 6–8 points of contact with the peaks of the corrugations of member 12 and the sheets 14, 16. Generally, the corrugations on one face of strip 12 are slightly larger in width than those on the other face. The length of the composite strip 10 can be, for example, about 28 inches, although any suitable length and height can be used for the strip 10 as desired.

The strip 10 is divided into four panels 10a, 10b, 10c, 10d. The four panels are of equal length in the preferred embodiment. However, it is necessary that only the two middle panels 10b, 10c be of the same length. Each of the panels can be folded about a fold line 17 which is formed, for example, by pressing a die across the height of the strip 10 to slightly perforate or score one of the solid sheets 14, 16, so that the panels 10a, 10b, 10c, and 10d can easily be folded about the lines 17 in a defined manner.

Each of the panels has a cut-out 19 along one edge thereof. The cut-out is of generally triangular shape and extends approximately half way across the height of the strip 10. The width of each cut-out 19 at its base is, in the example being described, approximately ⅜ of an inch tapering to about ⅛ of an inch at its apex. Again, any suitable dimensions can be used.

As seen in FIG. 1, there are cut-outs 19 on one (upper) edge of three adjacent panels 10a, 10b, and 10c and cutout 19 on the opposite (lower) edge of the panel 10d.

To form a support module, the panels 10a, 10b, 10c and 10d are folded inwardly (out of the plane of the drawing) about the fold lines 17. The notches 19a and 19d of panels 10a and 10d are interlocked with the ends of these panels being inside of each other. When the interlocking of the panels is accomplished, as shown better in FIG. 3, a generally triangular support module 25 is formed. The support module 25 is relatively rigid in the vertical direction because of the underlying construction of the strip material 10 and also because of the rigidity provided by the interlocking of the end panels 10a and 10d.

As seen in FIGS. 3 and 4, there is a tray or other suitable container 30, of plastic or other suitable water impervious material. The container 30 can be of any desired size or shape. It is preferred that the container be formed with a series of upwardly extending projections or dimples 32 on its bottom 34. The lower edges of the panels of the support module 25 are preferably rested on top of a number of these projections 32. The upper edges of the interlocked panels are available to serve as a support for the plant pot.

The plant pot 40 can be of any suitable material, usually porous clay or other similar material. Often times there will be a hole in the bottom of the pot. Also, the pot can be of water impervious material, such as plastic.

An opening 42 is made near or in the bottom of the pot into which is inserted a capillary wick 44 to make contact with the sack in the pot. The capillary wick 44 is preferably a strip of a textile material, for example, polyester, which has the ability to absorb water and transmit water by capillary action from the container 30 to the soil in the pot.

As seen in FIG. 4, the lower set of panel edges of module 25 is placed on the projections 32 on the bottom of the waterproof container 30 and the bottom of the plant pot is rested along the on the set of upper edges of the set of module panels. It should be understood that the module should have a size such that it can support the pot, i.e., the diameter of the pot should be greater than the overall size of two adjacent panels of the module. In the example being described, with a strip length of approximately 28½ inches long, each panel of the triangular module will be about 7 inches long and the perpendicular distance from an apex of the triangle to the opposite base about 6½ inches. While the pot can be supported on the upper edges of any two of the panels of the module, it is preferred that it rest on the upper edges of three of the panels. As explained previously, by making the length of the strip 10 larger or shorter, the size of the module can be determined.

As seen in FIG. 4, the capillary wick 42 extends into the container 30 near its bottom. When the container 30 is filled with water, the wick dips into the water, water is absorbed by the wick and passed by capillary action to the soil in the plant pot.

FIG. 5 shows how two of the modules 25 are interlocked. Here, the two cut-outs 19b and 19c of the panels 10b and 10c which were not previously used in interlocking the panels to form the module of FIG. 2 are now used to form an interlocking relationship with the corresponding cut outs of another module 25 which has been turned upside down with respect to the first named module. Thus, as can be seen, the overall shape of the support formed by the two interlocked modules is somewhat generally rectangular and the overall size and support weight capability of the support has been increased. For example, with the two panels 10a on opposite sides of the two modules, the overall size of the support is now about 8 inches. In addition, there is a central area of generally diamond shape of about approximately 5 inches between opposing peaks of the diamond.

The plant pot support of the present invention is economical to produce and is highly effective in supporting the pot. It also greatly simplifies slipping of the support since the strips 10 are shipped flat and assembly by the user. The strips are also sturdy and can support substantial weight.

What is claimed:

1. A plant watering system comprising:
   a container having bottom and side walls for holding water,
   free standing support means for a plant pot, said support means formed by an elongated strip of water impervious material which is foldable into a plurality of panels, means self-container within said strip for interlocking the panels without the use of any additional fasteners to expose upper and lower sets of panel edges to form a support module having an open center section upon resting said lower set of panel edges on the bottom of the container and the plant pot on the upper set of panel edges,
   and a capillary wick for extending into the soil of the plant pot and through the open center sections of the support module into the container to supply water by capillary action from the reservoir to the plant pot soil.

2. A plant watering system as in claim 1 wherein the panels of said support member are of equal length.

3. A plant watering system as in claim 1 further comprising score lines on said strip to facilitate the folding of said panels.

4. A plant watering system as in claim 2 further comprising score lines on said strip to facilitate the folding of said panels.

5. A plant watering system as in claim 1 wherein said elongated strip forming said support means comprises a corrugated type core with a sheet of material on each side thereof.

6. A plant watering system as in claim 1 wherein said self-contained interlocking means of said strip of said support means comprises cut-out notches, one adjacent the upper edge and the other adjacent the lower edge of the panels which are to be interlocked, the notches of said two panels interfitting with each other.

7. A plant watering system as in claim 6 wherein said support module has four panels with the interlocking notches being on the two end panels to form a module which is generally triangular in shape.

8. A plant watering system as in claim 1 wherein said support means further comprises a second support module, and means self contained within the structure of said first and said second support modules for interlocking the first and second support modules.

9. A plant watering system as in claim 8 wherein said self-contained interlocking means of said strip of said support means comprises a cut-out notch one adjacent the upper edge and the other adjacent the lower edge of the panels which are to be interlocked, the notches of said two panels interfitting with each other, said self-contained means for interlocking, the two support modules comprises a cut-out notch on the upper edges of two adjacent panels of one support module and a cut-out notch on the lower edge of two panels of the other support module which interfit with the notches on the upper edges of said first named module.

10. A plant watering system as in claim 7 wherein said support means further comprises a second support module of the same type as the first support module, and means self-contained within the structure of said first and said second support modules for interlocking the first and second modules.

11. A plant watering system as in claim 10 wherein said self-contained means for interlocking the two support modules comprise a cut-out notch on the upper edges of two adjacent panels of one support module and a cut-out notch on the lower edges of two panels of the other support module which interfit with the notches on the upper edges of said first named module to form a generally rectangular support means with an interior support structure of generally diamond shape.

* * * * *